United States Patent
Cavallari

(10) Patent No.: US 6,640,961 B2
(45) Date of Patent: Nov. 4, 2003

(54) UNIT FOR FEEDING AN ORDERED SUCCESSION OF PRODUCTS TO AN UNLOADING STATION

(75) Inventor: Stefano Cavallari, Bologna (IT)

(73) Assignee: Azionaria Costruzioni Macchine Automatiche S.p.A., Bologna (IT)

( * ) Notice: Subject to any disclaimer, the term of this patent is extended or adjusted under 35 U.S.C. 154(b) by 0 days.

(21) Appl. No.: 10/158,060

(22) Filed: May 31, 2002

(65) Prior Publication Data

US 2002/0195315 A1 Dec. 26, 2002

(30) Foreign Application Priority Data

Jun. 21, 2001 (IT) .................................. BO2001 A0394

(51) Int. Cl.$^7$ ............................................... B65G 47/31
(52) U.S. Cl. ................................ 198/460.2; 198/419.2; 198/433
(58) Field of Search ................. 198/460.2, 419.2, 198/433, 428, 418.7, 460.1, 459.5

(56) References Cited

U.S. PATENT DOCUMENTS

| | | | |
|---|---|---|---|
| 3,621,981 A | * 11/1971 | Nimmo, Jr. et al. | ........... 198/39 |
| 4,640,408 A | * 2/1987 | Eaves | ........................ 198/460 |
| 4,960,198 A | 10/1990 | Hogenkamp | |
| 4,991,708 A | * 2/1991 | Francioni | ................ 198/419.2 |
| 5,147,027 A | * 9/1992 | Cruver | .................... 198/419.3 |
| 5,322,154 A | * 6/1994 | Lenherr | ..................... 198/460 |
| 5,634,551 A | * 6/1997 | Francioni et al. | ........ 198/460.1 |
| 5,906,265 A | 5/1999 | Spatafora | |
| 6,035,994 A | 3/2000 | Blatter | |
| 6,170,639 B1 | * 1/2001 | Diedrich | .................. 198/461.2 |
| 6,199,680 B1 | * 3/2001 | Sakai et al. | ............... 198/419.2 |
| 6,305,525 B1 | * 10/2001 | Miller et al. | ............. 198/460.2 |
| 6,341,685 B1 | * 1/2002 | Spatafora et al. | ........ 198/460.2 |

FOREIGN PATENT DOCUMENTS

| | | | | |
|---|---|---|---|---|
| DE | 3347626 A1 | * 7/1985 | ............. 198/460.2 |
| DE | 3819348 | 9/1989 | |
| EP | 0 427 323 a1 | * 5/1991 | ................. 198/433 |
| EP | 0806383 | 11/1997 | |
| GB | 2 025 884 A | * 1/1980 | ............. 198/460.2 |
| IT | 1285693 | 5/1996 | |
| JP | 58-125520 | * 7/1983 | ............. 198/460.2 |
| JP | 5-319565 | * 12/1993 | ............. 198/460.2 |

* cited by examiner

Primary Examiner—Douglas Hess
(74) Attorney, Agent, or Firm—Davidson Berquist Klima & Jackson, LLP

(57) ABSTRACT

A unit for feeding an ordered succession of products to an unloading station comprises: an arranging device including a first and a second conveyor, each constituting a first and a second conveyor portion on a feed path whose total length is the sum of the two portions that complementarily vary in length relative to each other; a device for feeding the products to the first conveyor in sets; a transfer device located between the conveyor portions, coupled to the conveyors and designed to complementarily vary the lengths of the portions. The transfer device comprises two resilient belts that transfer the products from the first to the second portion. The feed device is cyclically mobile and, consequently, the first conveyor and the transfer device are cyclically mobile according to a law of motion and timing dependent upon the cyclic motion of the feed device.

16 Claims, 9 Drawing Sheets

UNIT FOR FEEDING AN ORDERED SUCCESSION OF PRODUCTS TO AN UNLOADING STATION

BACKGROUND OF THE INVENTION

The present invention relates to a unit for feeding an ordered succession of products to an unloading station.

The invention is advantageously used to feed products such as bars of soap, sweets and the like to a wrapping machine, to which the present specification refers but without thereby restricting the scope of the inventive concept.

Installations for the production and packaging of products of this kind usually include wrapping machines which must receive the products to be wrapped in ordered succession, that is to say, suitably spaced, and dispensing devices which feed products in a continuous stream. It is therefore necessary to space the products out during their transfer from the dispensing device to the wrapping machine.

In the art, feeding devices used to arrange products in ordered fashion for feeding to an automatic machine transport the products in succession on a first conveying device which moves in one direction at a first speed and which comprises a first, variable length conveyor portion extending from a loading station to a mobile transfer station. An ordered succession of the products are then transported on a second conveying device which moves at a second speed and which comprises a second conveyor portion of variable length to complement the first conveyor portion. The lengths of the two conveyor portions are varied by an adjusting device according to the position of the products moving on the first conveying device. Thanks to these devices, a continuous scrambled stream of products moving on the first conveyor can be arranged in way that makes the products suitable for subsequent handling.

If products are fed to the first conveyor not continuously but by feeding means that impart on the first conveyor a movement that is closely linked to the predetermined law of motion that governs the feeding means themselves, devices of the above mentioned type have proved to be unsuitable to arrange the products feeding out towards an unloading station and to correctly adjust their spacing as they are dispensed to the wrapping machine.

The aim of the present invention is to provide a unit for feeding the products to an automatic machine even when the products are fed to the first conveyor according to a law of motion imparted by respective feed means.

SUMMARY OF THE INVENTION

Accordingly, the present invention provides a unit for feeding an ordered succession of products to an unloading station, comprising an arranging device comprising a first and a second conveyor belt each constituting a first and a second portion of a feed path that has a defined total length and each portion being complementarily variable in length relative to the other, means for feeding the products to the first conveyor, a transfer station located between the two portions and comprising a carriage coupled to the two conveyors to complementarily vary the lengths of the two portions, transfer means mounted on the carriage and designed to transfer the products from the first to the second portion, wherein the feed means are cyclically mobile to transfer the products to the first conveyor in sets consisting of a predetermined number of products, the first conveyor and the transfer means being cyclically mobile according to a law of motion and timing dependent upon the cyclic motion of the feed means.

BRIEF DESCRIPTION OF THE DRAWINGS

The present invention will now be described with reference to the accompanying drawings, which illustrate a preferred embodiment without limiting the scope of the inventive concept, and in which.

DESCRIPTION OF THE PREFERRED EMBODIMENTS

Figure 1:
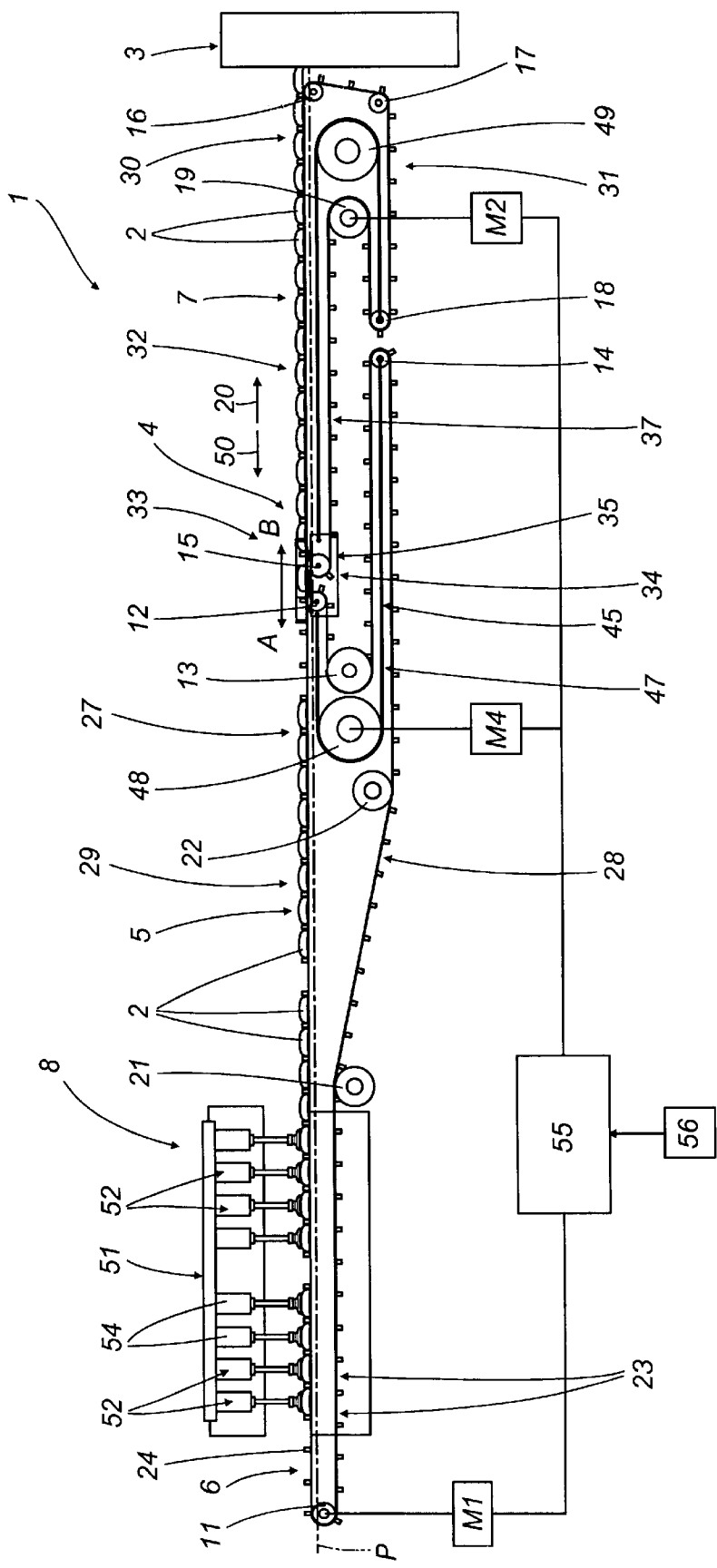
FIG. 1 is a scaled-down, schematic side view, with some parts in cross section and others cut away, of a unit for feeding an ordered succession of products made in accordance with the present invention and illustrated in one stage of its operation.
Figure 2:
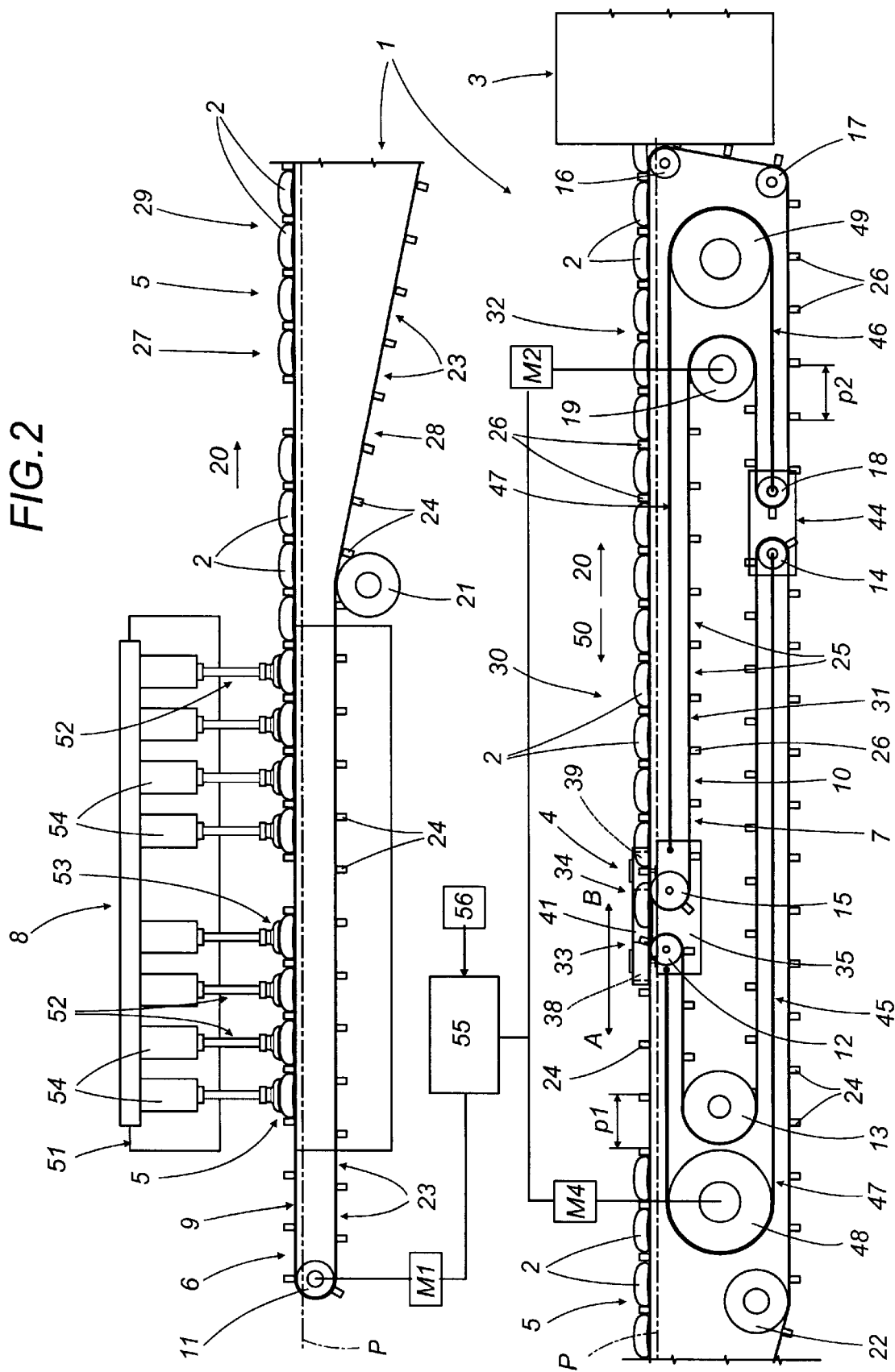
FIGS. 2 and 3 are schematic side views, with some parts in cross section and others cut away, of the unit for feeding an ordered succession of products of FIG. 1 illustrated in two successive stages of its operation.
Figure 3:
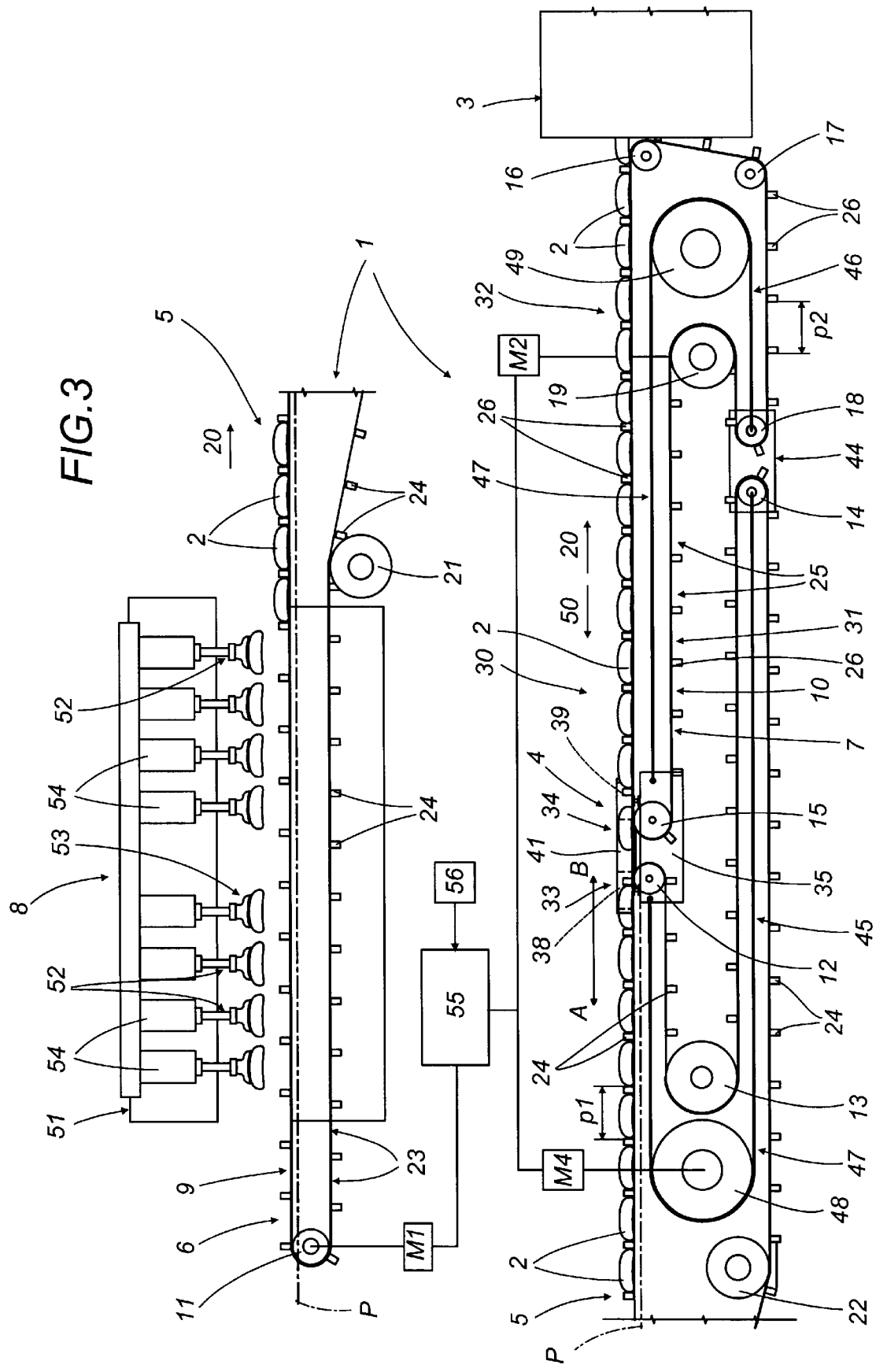

With reference to FIGS. 1, 2 and 3 the numeral 1 denotes in its entirety a unit for feeding an ordered succession of products 2 to an unloading station, which is schematically illustrated as a block 3.

The unit 1 comprises an arranging device 4 designed to receive a succession of products 2 grouped in sets 5 consisting of a predetermined number of products 2. The arranging device 4 comprises a first and a second conveyor belt 6 and 7 positioned in series and substantially horizontal, the first of which, namely the conveyor 6, is designed to receive the products 2 from a feed device 8, while the second conveyor 7, is designed to feed the products 2 in ordered succession to an automatic machine, which is not illustrated, through an unloading station 3.

The conveyors 6 and 7 consist of belts 9 and 10 looped around a plurality of pulleys labeled 11–14 for the first conveyor 6, and 15–19 for the second conveyor 7, the pulleys being rotatable about respective axes which are parallel to each other and transversal to the feed direction, labeled 20, of the conveyors 6 and 7. The numerals 21 and 22 denote tensioning and transmission pulleys of the first conveyor 6.

In the embodiment illustrated in FIGS. 1, 2 and 3, the pulleys 12, 13, and 14 of the conveyor 6 and 15, 16, 17 and 18 of the conveyor 7 are idle driven pulleys, while the pulleys 11 and 19 are drive pulleys with respective motors, labeled M1 and M2, which drive the conveyors 6 and 7 at a defined speed, respectively.

The belt 9 of the first conveyor 6 has a succession of pockets 23 to contain the products 2 and formed by a plurality of protrusions 24 uniformly distributed along the belt 9 with a space p1 between each one and the next. Similarly, the belt 10 of the second conveyor 7 has a succession of pockets 25 to contain the products 2 and formed by a plurality of protrusions 26 uniformly distributed along the belt 10 with a space p2 between each one and the next, which in the embodiment illustrated, is substantially the same as the space p1, but which could, if necessary, differ from it. The size of the pockets 23 and 25 depends on the size of the products 2 so that the latter sit snugly inside them and are restricted in movement either completely or within well-defined limits, thus guaranteeing the correct operation of the automatic machine.

As shown in FIGS. 1, 2 and 3, the pulleys 12 and 14 of the first conveyor 6 are end transmission pulleys and form on the corresponding belt 9 a forward branch 27 and a return branch 28, the former comprising a conveyor portion 29 extending between the pulleys 11 and 12. Similarly, the pulleys 15 and 18 of the second conveyor 7 are end transmission pulleys and form on the corresponding belt 10 a forward branch 30 and a return branch 31, the former comprising a conveyor portion 32 extending between the pulleys 15 and 18.

The conveyor portions 29 and 32 form part of a path P of defined length along which the products 2 are fed in the direction 20 from the feed device 8 to the unloading station 3, and the contiguous ends of the conveyor portions 29 and 32 form between them a transfer station 33. The pulleys 12 and 15 form part of a transfer device 34 comprising a carriage which is schematically illustrated as a block 35 supporting the two pulleys 12 and 15.

As shown in FIGS. 4 to 9, the carriage 35 also supports two pairs of pulleys 36, 37 and 38, 39 mounted on respective shafts 36a, 37a and 38a, 39a positioned perpendicularly to the feed direction 20 and to the shafts of the pulleys 12 and 15. The pulleys 12 and 15 may be kinematically and respectively connected to the shafts 36a, 37a and 38a, 39a in known manner (as described in the Italian ACMA patent No. 1285693, incorporated herein by reference) or they may be equipped with a separate motor, labeled M3.

As shown in FIGS. 4, 5, 7 and 9, the pulley pairs 36, 37 and 38, 39 respectively support belts 40 and 41, each having respective straight portions 42 and 43, which are parallel to each other and located on opposite sides of the feed path P. Consequently, the straight portions 42 and 43 extend between the conveyor portions 29 and 32 close to the pulleys 12 and 15.

As shown in FIGS. 2 and 3, the pulleys 14 and 18 are mounted on a second carriage 44 which connects to each other the two first ends of two segments 45 and 46 of a drive belt 47 looped around two pulleys 48 and 49 and, at the other two ends of its segments 45 and 46, being connected to the ends of the first carriage 35. The pulley 48 is a drive pulley and is connected to a motor M4, while the pulley 49 is an idle, driven pulley.

The motor M4 drives the drive belt 47 in such a way as to move the carriage 35 along the feed path P in the direction 20 or in the opposite direction, labeled 50, so as to complementarily vary the length of the conveyor portions 29 and 32 to which there corresponds an equal and opposite movement of the second carriage 44 in a direction parallel to the path P. As shown in FIGS. 1, 2 and 3, the feed device 8 forms part of a bar soap 2 plodder schematically illustrated as a block 51, and consists of a plurality of pickup and transfer elements 52 having on the ends of them respective suction cups 53 that move up and down on pistons 54. Through said pickup and transfer elements 52, the feed device 8 cyclically transfers the products 2 from the machine 51 to the pockets 23 on the first conveyor 6.

In the embodiment illustrated, the feed device 8 consists of two groups of pickup and transfer elements 52 capable of transferring sets 5 consisting of two groups of four products 2 each, with a space p1 between each one and the next, from the machine 51 to the first conveyor 6.

According to the invention, the first conveyor 6 also moves cyclically according to a law of motion and timing dependent upon the cyclic motion of the feed device 8. In particular, as shown in FIGS. 1, 2 and 3, the first conveyor 6 follows a law of intermittent motion that is defined by a step of pausing, illustrated in FIGS. 1, 2, 4 and 5, during which the device 8 transfers and places in the pockets 23 a set 5 of products 2, and a step of feeding the products 2 towards the second conveyor 7 which moves continuously (FIGS. 3, 6, 7, 8 and 9).

The products 2 are transferred from the first conveyor 6 to the second conveyor 7 by the transfer device 34 which also moves cyclically, with reciprocating motion, between a first end position, labeled A where it is close to the feed device 8, and a second end position, labeled B, where it is away from the feed device 8, in such a way as to complementarily vary the lengths of the conveyor portions 29 and 32 of the first and second conveyors 6 and 7, respectively.

Figure 4:
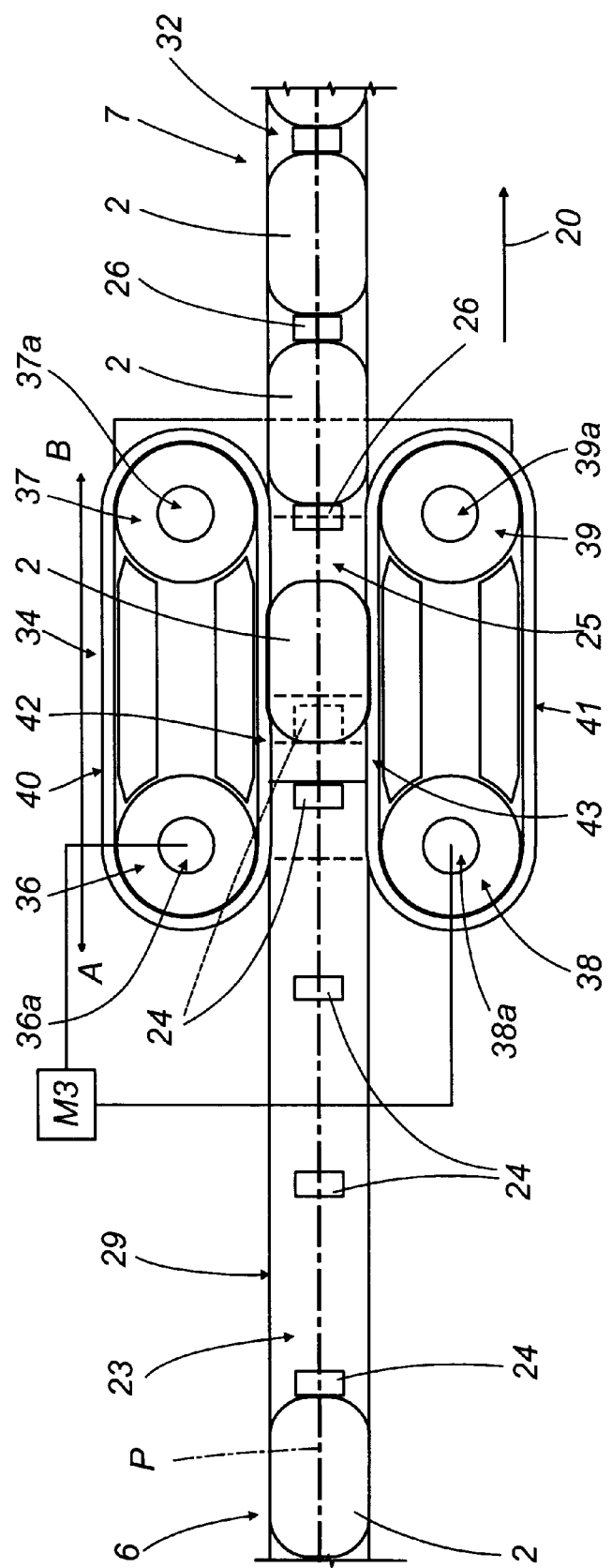
FIGS. 4 and 5 are partial plan views, with some parts cut away for clarity, of the unit shown in FIGS. 1 and 2, respectively.
Figure 5:
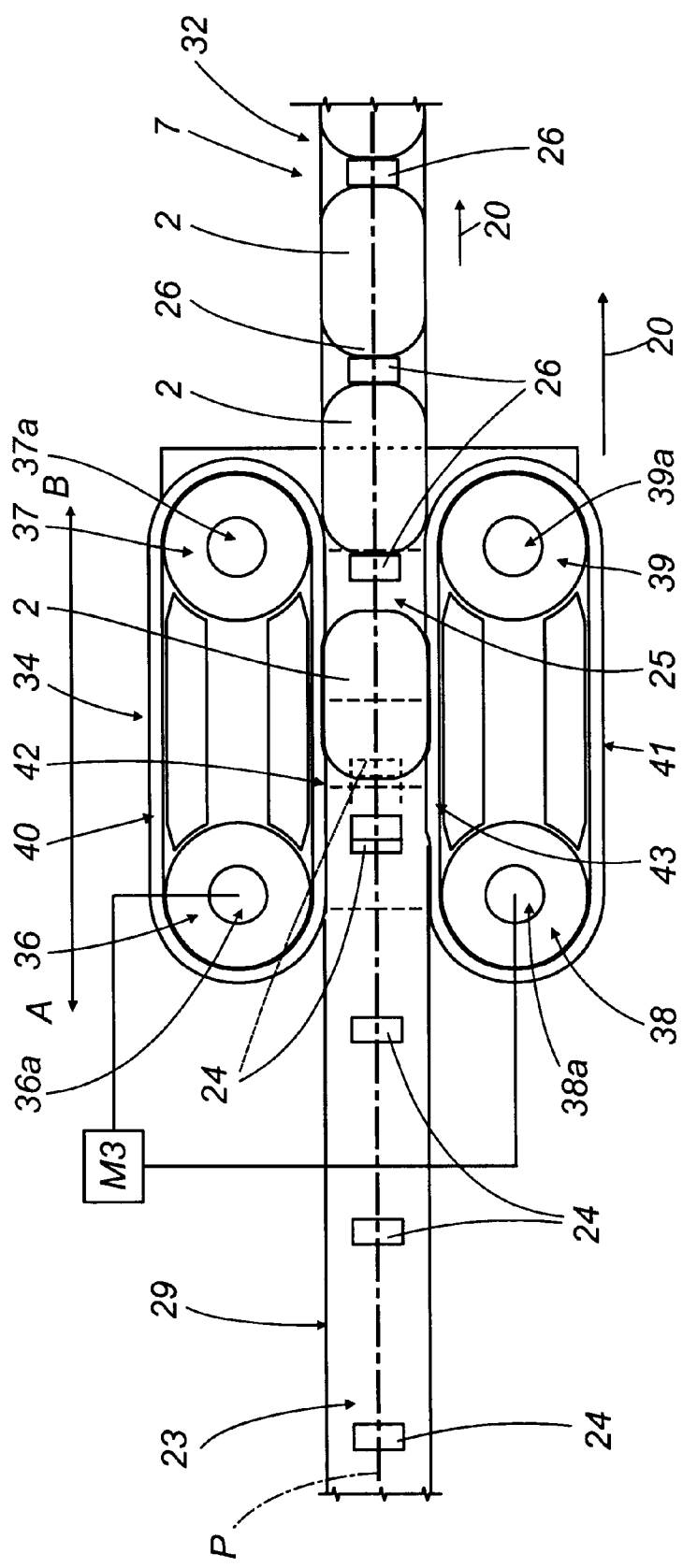
Figure 6:
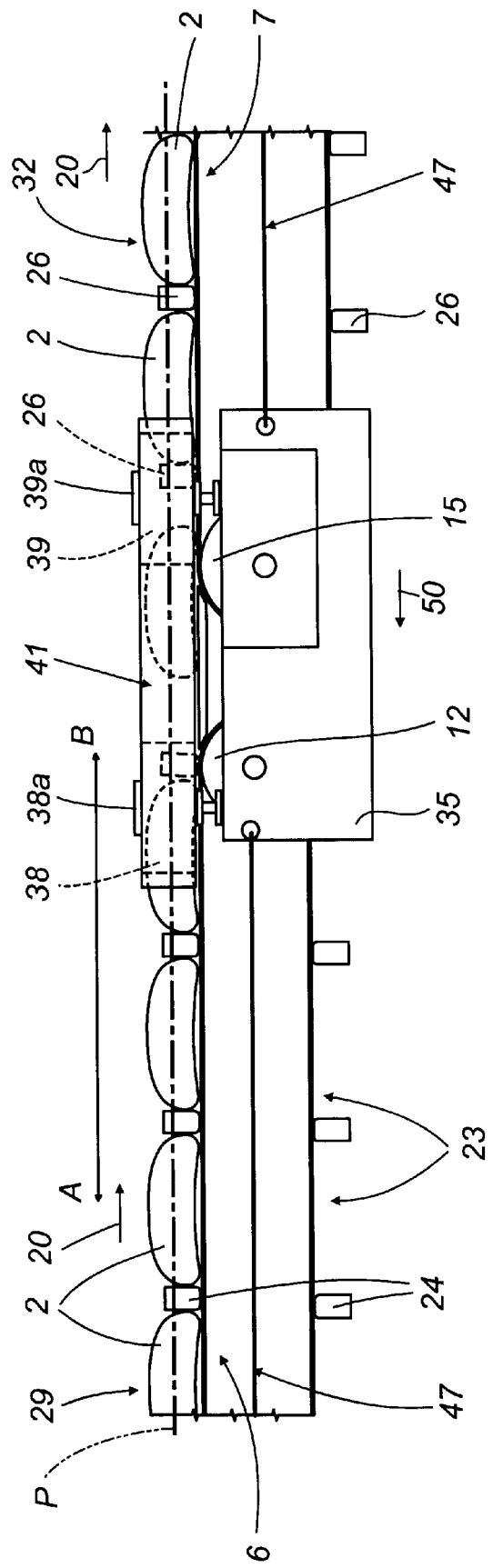
FIGS. 6 and 7 are a schematic side view, with some parts cut away for clarity, and a plan view, respectively, of a detail of the unit shown in FIGS. 1 and 3 in a stage of its operation different from that illustrated in FIGS. 1 to 5.
Figure 7:
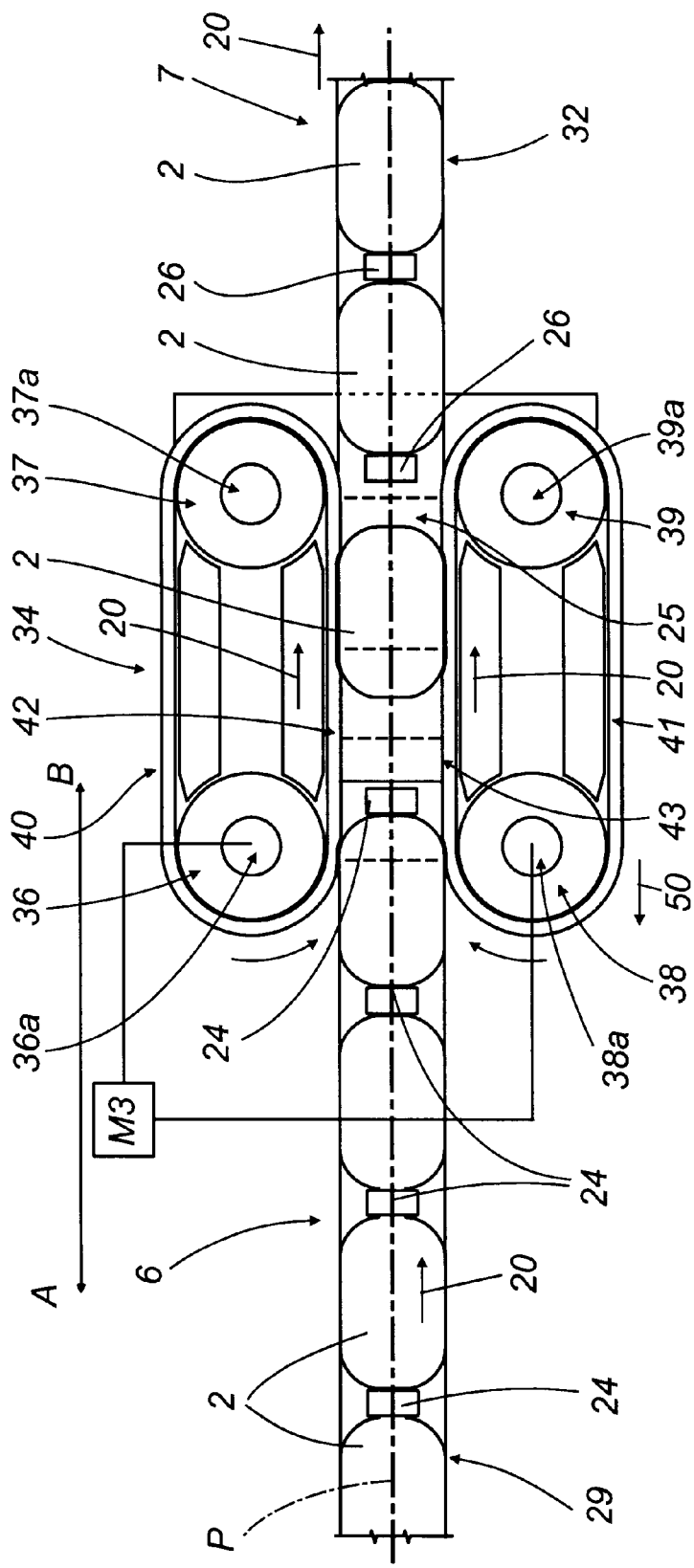
Figure 8:
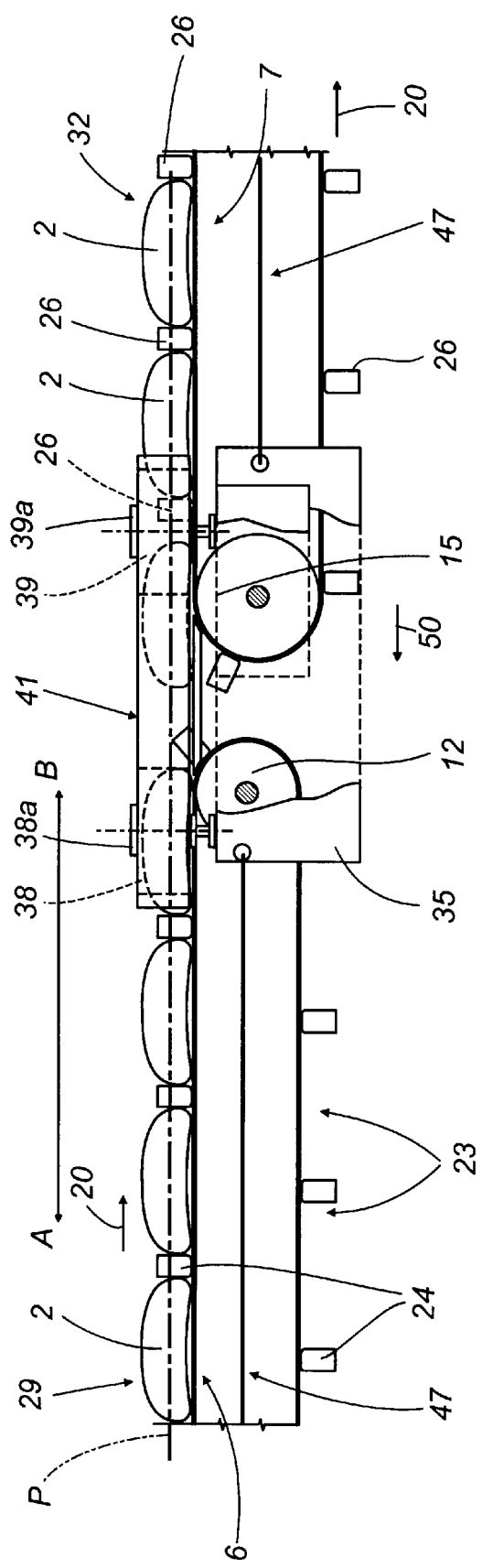
FIGS. 8 and 9 are, respectively, a schematic side view, with some parts cut away for clarity, and a plan view of the detail shown in FIGS. 6 and 7 in a different stage of its operation.
Figure 9:
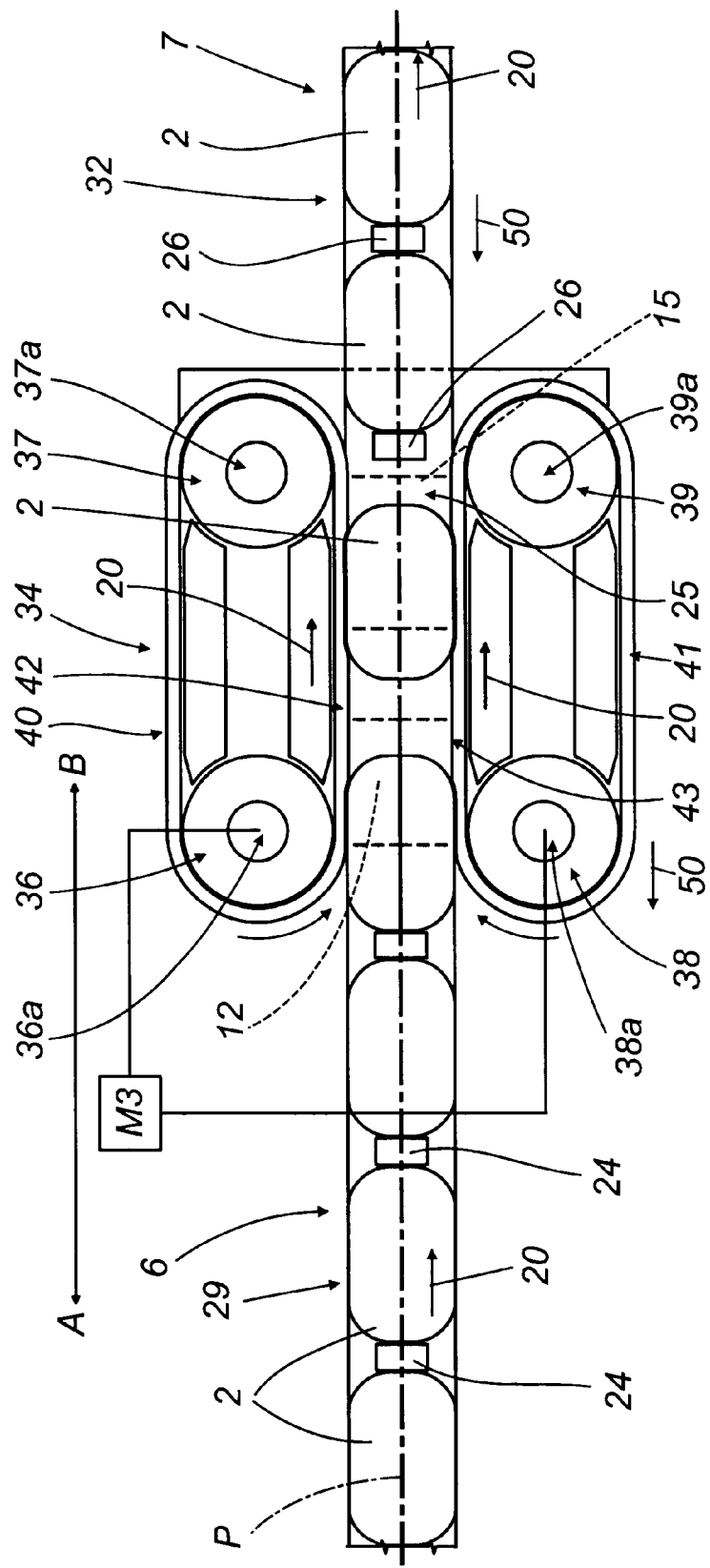

The belts 40 and 41 move cyclically, with intermittent motion, and more specifically, perform a first transfer step in which the branches 42 and 43 move in the direction 20 during the passage of the transfer device 34 from the end position B to the end position A in the direction 50, as illustrated in FIGS. 6, 7, 8 and 9, synchronized with the feeding step of the first conveyor 6, and a second transfer step, illustrated in FIGS. 4 and 5, in which the branches 42 and 43 stop and the device 34 moves in the direction 20 carrying with it at least one product 2 placed between the branches 42 and 43 of the belts 40 and 41, which are made of a resilient material of uniform thickness to improve their grip on and adherence to the products 2 themselves. This second step is synchronized with the step of pausing the first conveyor 6.

It should be stressed that during this step, when the first conveyor 6 is pausing, the driving of the device 34, and thus of the first carriage 35, in the direction 20 by the drive belt 47 enables the return branch 28 of the belt 9 of the first conveyor 6 to be unwound from the end pulley 12 along the path P and enables the forward branch 30 of the belt 10 of the second conveyor 7, moving continuously, to be wound around the pulley 15. More specifically, after the pausing step of the first conveyor 6 to allow reception of the sets 5 and during which the carriage 35 proceeds along the path P in the direction 20 from position A to position B, the first conveyor 6 accelerates in such a way that the first product 2 in the set 5 can reach the last product 2 in the set 5 placed in the preceding cycle. This acceleration step is followed by a step of feeding the first conveyor 6 at a substantially constant speed equal to the speed of the second conveyor 7. More specifically, accelerating the first conveyor 6 makes it possible, in a case such as that described above and illustrated where the groups of four products 2 for each set 5 are separated by a space p1, to eliminate the space p1.

Lastly, the numeral 55 denotes a control unit connected to the motors M1, M2, M4 and, if fitted, also to the motors M3 of the transfer device 34. The control unit 55 is controlled from a panel 56 which can be used to enter the data describing the structural and functional characteristics and the related laws of cyclic motion of the first and second conveyors 6 and 7 and of the transfer device 34 in relation to the law of cyclic motion of the feed device 8.

What is claimed is:

1. A unit for feeding an ordered succession of products to an unloading station, comprising an arranging device comprising a first and a second conveyor belt each constituting a first and a second portion of a feed path that has a defined total length and each portion being complementarily variable in length relative to the other, means for feeding the products to the first conveyor, a transfer station located between the two portions and comprising a carriage coupled to the two conveyors to complementarily vary the lengths of the two portions, transfer means mounted on the carriage and designed to transfer the products from the first to the second portion, wherein the feed means are cyclically mobile to transfer the products to the first conveyor in sets consisting of a predetermined number of products, the first conveyor and the transfer means being cyclically mobile according to a law of motion and timing dependent upon the cyclic motion of the feed means.

2. The unit according to claim 1, wherein the first conveyor follows a law of intermittent motion that is defined by a pausing step to enable the feed means to position the products on the first conveyor, and a step of feeding the products towards the second conveyor.

3. The unit according to claim 1, wherein the feed means transfer the products to the first conveyor in sets consisting of a predetermined number of products and separated by a predetermined space.

4. The unit according to claim 1, wherein the transfer means are kinematically connected to the two conveyors through respective end transmission pulleys of the conveyors themselves, the transfer means moving with reciprocating motion between a first end position and a second end position where they are, respectively, close to the feed means and away from the feed means, in such a way as to complementarily vary the lengths of the portions of the first and second conveyors.

5. The unit according to claim 4, wherein the transfer means comprise two belts looped around respective pulleys whose axes are transversal to the axes of the transmission pulleys of the conveyors, and positioned on opposite sides of the feed path, the belts moving with intermittent motion defined by a first transfer step between the second end position and the first end position, and a pause step during which the transfer means pass from the first end position to the second end position.

6. The unit according to claim 4, wherein the feeding step of the first conveyor comprises an acceleration step followed by a step of feeding at a constant speed substantially equal to the speed of the second conveyor.

7. The unit according to claim 6, wherein the acceleration step enables the first product in the set to reach the transfer means as they move from the first end position to the second end position, and the subsequent feeding step is synchronized with the last part of the movement of the transfer means from the first end position to the second end position, as well as with the entire movement of the transfer means from the second end position to the first end position during which the transfer means cyclically transfer the products from the first to the second conveyor.

8. The unit according to claim 7, wherein the feed means positions on the first conveyor, at least two groups of products separated by a space of predetermined length that is greater than the space between the products within each group, the step of accelerating the first conveyor also making it possible to eliminate the space between the groups.

9. The unit according to claim 8, comprising a control panel connected to a central control unit and used for setting structural and functional characteristics and related laws of cyclic motion of the first and second conveyors and of the transfer means in relation to the law of cyclic motion of the feed means.

10. The unit according to claim 9, wherein the first conveyor comprises a plurality of pockets designed to contain the products and formed by a plurality of protrusions uniformly distributed with a predetermined space between each one and the next.

11. The unit according to claim 9, wherein the second conveyor comprises a plurality of pockets designed to contain the products and formed by a plurality of protrusions uniformly distributed with a predetermined space between each one and the next.

12. The unit according to claim 9, wherein the belts of the transfer means are made of a resilient material of substantially uniform thickness.

13. The unit according to claim 1, comprising a control panel connected to a central control unit and used for setting structural and functional characteristics and related laws of cyclic motion of the first and second conveyors and of the transfer means in relation to the law of cyclic motion of the feed means.

14. The unit according to claim 1, wherein the first conveyor comprises a plurality of pockets designed to contain the products and formed by a plurality of protrusions uniformly distributed with a predetermined space between each one and the next.

15. The unit according to claim 1, wherein the second conveyor comprises a plurality of pockets designed to contain the products and formed by a plurality of protrusions uniformly distributed with a predetermined space between each one and the next.

16. The unit according to claim 1, wherein the belts of the transfer means are made of a resilient material of substantially uniform thickness.

* * * * *